(12) United States Patent
Yamazaki et al.

(10) Patent No.: US 10,802,007 B2
(45) Date of Patent: *Oct. 13, 2020

(54) OXYGEN DETECTING COMPOSITION AND OXYGEN DETECTING BODY

(71) Applicant: TOKIWA SANGYO CO., LTD., Sagamihara-shi, Kanagawa (JP)

(72) Inventors: Tatsuo Yamazaki, Sagamihara (JP); Hiroshi Kase, Sagamihara (JP); Naoto Abe, Sagamihara (JP)

(73) Assignee: TOKIWA SANGYO CO., LTD., Sagamihara-Shi, Kanagawa (JP)

( * ) Notice: Subject to any disclaimer, the term of this patent is extended or adjusted under 35 U.S.C. 154(b) by 211 days.

This patent is subject to a terminal disclaimer.

(21) Appl. No.: 15/999,789

(22) PCT Filed: Feb. 19, 2016

(86) PCT No.: PCT/JP2016/054815
§ 371 (c)(1),
(2) Date: Aug. 20, 2018

(87) PCT Pub. No.: WO2017/141418
PCT Pub. Date: Aug. 24, 2017

(65) Prior Publication Data
US 2020/0072805 A1    Mar. 5, 2020

(51) Int. Cl.
*G01N 31/00* (2006.01)
*G01N 31/22* (2006.01)

(52) U.S. Cl.
CPC .................................. *G01N 31/225* (2013.01)

(58) Field of Classification Search
CPC ....... G01N 31/225; G01N 21/783; G01N 31/00
See application file for complete search history.

(56) References Cited

U.S. PATENT DOCUMENTS

| 4,349,509 A | 9/1982 | Yoshikawa et al. |
| 2016/0153946 A1* | 6/2016 | Nakamura ............ G01N 31/225 436/136 |

(Continued)

FOREIGN PATENT DOCUMENTS

| JP | 56-8547 A | 1/1981 |
| JP | 2007-183157 A | 7/2007 |

(Continued)

*Primary Examiner* — Jennifer Wecker
*Assistant Examiner* — Michael Paul Shimek
(74) *Attorney, Agent, or Firm* — Birch, Stewart, Kolasch & Birch, LLP

(57) ABSTRACT

To provide: a composition for oxygen detection, which has excellent oxygen detection characteristic (ability), and which is safer than conventional compositions for oxygen detection, thereby being able to be sealed in packages containing food, pharmaceutical products or the like without anxiety; and an oxygen detector onto which this composition for oxygen detection is applied or printed. This composition for oxygen detection contains a redox dye, a food dye, a reducing sugar, an edible reduction promoter and an edible humectant in the composition, and enables quick detection of the presence or absence of oxygen by means of color change. Since this composition for oxygen detection is composed only of food, a pharmaceutical product and edible components allowed to be used for the food or pharmaceutical product, this composition for oxygen detection is safe to the human body.

6 Claims, 1 Drawing Sheet

(56) References Cited

U.S. PATENT DOCUMENTS

2016/0216243 A1 7/2016 Nakamura et al.
2019/0251871 A1* 8/2019 Yamazaki ............. G09F 3/0291

FOREIGN PATENT DOCUMENTS

| JP | 2008-69278 A | 3/2008 |
| JP | 2009-107646 A | 5/2009 |
| WO | 2015/008792 A1 | 1/2015 |
| WO | 2015/050270 A1 | 4/2015 |

* cited by examiner

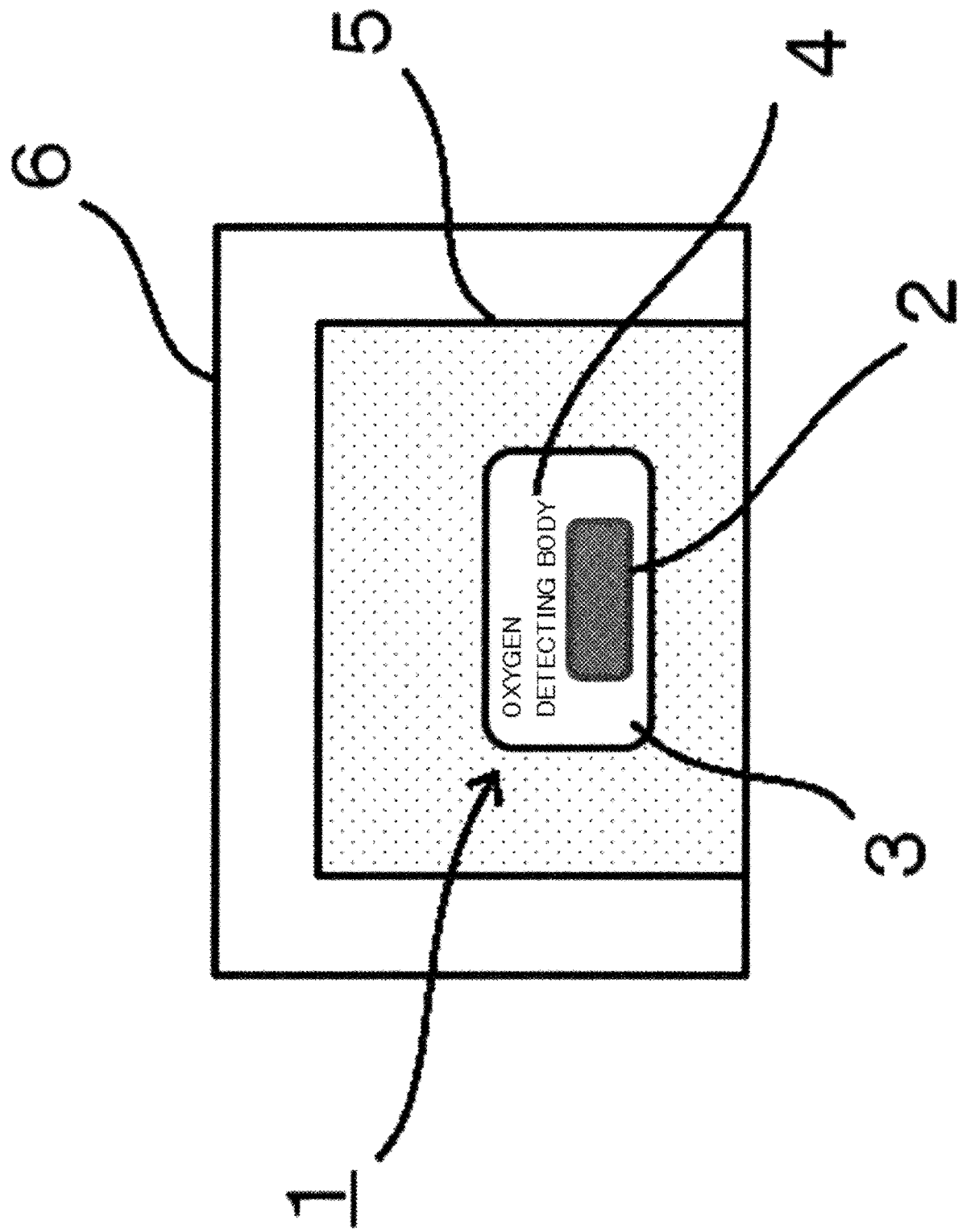

OXYGEN DETECTING COMPOSITION AND OXYGEN DETECTING BODY

TECHNICAL FIELD

The present invention relates to an oxygen detecting composition for detecting the presence or absence of oxygen.

More specifically, the present invention relates to an oxygen detecting composition, which is safe to the human body and can detect the presence or absence of oxygen by means of color change.

BACKGROUND ART

Conventionally, foods and pharmaceuticals have been often packaged such that the packaging body contains a deoxidizer in order to keep freshness.

In this case, in order to prevent, for example, discoloration of contents due to intrusion of oxygen and putrefaction caused by mold, bacteria, or the like, the packaging body is provided so as to contain the deoxidizer and in addition an oxygen detecting body for detecting the ability of the deoxidizer or for detecting intrusion of oxygen into the packaging body, the intrusion being caused by, for example, pinholes or sealing defect of the packaging body.

Such an oxygen detecting body utilizes a redox dye, which reversibly changes color by the oxidation-reduction, and reversibly changes color in response to the presence or absence of atmospheric oxygen.

For example, Japanese Patent No. 4022703 (Patent Document 1) proposes an oxygen detecting agent for pasting, which changes color quickly in response to a change in the oxygen concentration within a packaging container, the change being caused by a deoxidizer, so that the decrease in the oxygen concentration can be easily detected by a visual observation without time delay.

This oxygen detecting agent for pasting is a tape-shaped agent containing a tape-shaped oxygen detecting agent in which an oxygen detecting composition is fixed to a tape-shaped substrate having gas-impermeability and moisture-impermeability; and a single-sided adhesive plastic tape having a wider width than the tape-shaped oxygen detecting agent, being at least partially transparent, and having an adhesive layer on one side of the tape, wherein the entire adhesive surface of the oxygen detecting composition of the tape-shaped oxygen detecting agent is adhesively attached to the single-sided adhesive tape in a substantially void-free manner.

CITATION LIST

Patent Literature

Patent Document 1: Japanese Patent No. 4022703 (Claims)

DISCLOSURE OF INVENTION

Technical Problem

However, when products directly contacting the human body, such as foods or pharmaceuticals, as contents are sealed in the packaging body, there is a problem in that the contents may come into contact with the oxygen detecting composition, which is applied or printed to a surface of the oxygen detecting body.

In the oxygen detecting agent for pasting disclosed in Patent Document 1 above, the oxygen detecting composition used contains components such as an organic solvent and a binder resin, and hence cannot be regarded as being sufficiently safe.

Under such circumstances, an object of the present invention is to provide an oxygen detecting composition having an excellent oxygen detection characteristic (capability), which is safer than conventional oxygen detection compositions, and can be sealed in the packaging body containing foods, medical supplies, or the like at ease; and another object is to provide an oxygen detecting body in which the oxygen detecting composition is applied or printed.

Solution to Problem

In order to achieve such an object, an invention according to Claim 1 of the present invention is characterized in that an oxygen detecting composition comprises an oxidation-reduction colorant, an edible colorant, a reducing sugar, an edible reduction promoter, an edible humectant, and an edible thickener, wherein the oxidation-reduction colorant is comprised in an amount of 0.03 to 0.5 mass % based on the total amount of the composition, a compounding ratio of the oxidation-reduction colorant to the edible colorant is 1:0.5 to 1:1.5, and the edible thickener is comprised in an amount of 0.1 to 10 mass % based on the total amount of the composition.

An invention according to Claim 2 of the present invention, in the oxygen detecting composition according to Claim 1, is characterized in that the oxygen detecting composition comprises ethanol, water, or a mixture thereof.

An invention according to Claim 3 of the present invention, is an oxygen detecting body, wherein the oxygen detecting composition according to Claim 1 is applied or printed to a base material.

An invention according to Claim 4 of the present invention is characterized in that, in the oxygen detecting composition according to Claim 3, the base material is constituted by an inkjet label base material.

An invention according to Claim 5 of the present invention is characterized in that, in the oxygen detecting body according to Claim 3, the base material is consitituted by paper.

An invention according to Claim 6 of the present invention is an oxygen detecting body, wherein the oxygen detecting composition according to claim 2 is applied or printed to a base material.

Advantageous Effects of Invention

The oxygen detecting composition according to the present invention contains an oxidation-reduction (redox) colorant, an edible colorant, a reducing sugar, an edible reduction promoter, and an edible humectant in the composition, and can quickly detect the presence or absence of oxygen by means of color change.

Thus, this oxygen detecting composition is composed of only edible components, which are permitted to be used for foods, pharmaceuticals, or raw materials therefor, thereby being safe to the human body.

In particular, when an oxygen detecting composition according to the present invention contains an edible thickener, it has good coloring property and discoloration property, and provides quick color development and discoloration (color change).

This detecting composition may also be used in the form of being dissolved in ethanol, water, or a mixture thereof in order to facilitate an application or print of the detecting composition.

The oxygen detecting composition may also be applied or printed to a base material to use as an oxygen detecting body.

In this case, when the base material selected is an inkjet label base material and, in particular, the thickener is contained, better coloring property and discoloration property are provided, and color development and discoloration occur more quickly.

BRIEF DESCRIPTION OF DRAWING

FIG. 1 is a front view of an oxygen detecting body according to an embodiment of the present invention.

DESCRIPTION OF EMBODIMENTS

Hereinafter, the structure of an embodiment of an oxygen detecting composition according to the present invention will be described with reference to the drawing.

It is to be understood that the present invention is not limited to only the embodiment described in the drawing and that modifications can freely be made without departing from the spirit of the present invention.

As shown in FIG. 1, an oxygen detecting body 1 according to the present invention is provided with an oxygen detecting region which is formed of at least an oxygen detecting composition 2 and is formed on the surface thereof.

The oxygen detecting composition 2 constituting the oxygen detecting body 1 contains an oxidation-reduction colorant, an edible colorant, a reducing sugar, an edible reduction promoter, and an edible humectant.

The oxidation-reduction colorant selected is an aromatic compound including a long conjugated double bond system having π electrons mobile in a molecule, which is a compound changing the color reversibly by oxidation-reduction.

Examples of such a compound include:
methylene blue, new methylene blue, neutral red, indigo carmine, acid red, safranine T, phenosafranine, Capri blue, Nile blue, diphenylamine, xylene cyanol, nitrodiphenylamine, ferroin, and N-phenylanthranilic acid.

The content of the oxidation-reduction colorant is preferably set in a range that does not affect the safety of the contents.

More preferably, the range is selected such that LD50 (median lethal dose) is 1180 mg/kg or less.

The content (contained amount) is preferably 0.03 to 0.5 mass %, more preferably 0.05 to 0.2 mass % based on the total amount of the composition.

The edible colorant has an edible property and is added to facilitate visual recognition of discoloration upon detection of oxygen through color mixture with the oxidation-reduction colorant.

The edible colorant is not particularly limited as long as it has an edible property, and can be appropriately selected from well-known synthetic edible colorants (food dyes) and natural edible colorants (food dyes).

Examples include food red dyes such as Food Red No. 2, Food Red No. 3, Food Red No. 40, Food Red No. 102, Food Red No. 104, Food Red No. 106, and natural cochineal dye; food yellow dyes such as Food Yellow No. 4, Food Yellow No. 5, and natural safflower yellow dye; and blue dyes such as Food Blue No. 1 and Food Blue No. 2.

One or more kinds of the above-described edible colorants may be arbitrarily mixed for use.

The compounding ratio of the oxidation-reduction colorant to the edible colorant is preferably 1:0.5 to 1:1.5, more preferably 1:1 to 1:1.5.

The reducing sugar has an edible property.

Examples of the reducing sugar include ascorbic acid, ascorbate, erythorbic acid, erythorbate, arabinose, erythritol, galactose, xylose, glucose, mannose, fructose, and lactose.

In this case, from the viewpoint of reducing power and solubility, D-fructose is preferably selected.

The reducing sugar is incorporated in an amount of preferably 1 to 20 mass, more preferably 3 to 10 mass % based on the total amount of the composition.

The reduction promoter to be used is not particularly limited as long as it has an edible property.

Examples include sodium hydroxide, potassium hydroxide, sodium carbonate, and potassium carbonate.

The reduction promoter is incorporated in an amount of preferably 0.1 to 5 mass %, more preferably 0.5 to 3 mass % based on the total amount of the composition.

The humectant to be used is not particularly limited as long as it has an edible property.

Examples include glycerol and propylene glycol.

The humectant is incorporated in an amount of preferably 1 to 30 mass %, more preferably 5 to 10 mass % based on the total amount of the composition.

The oxygen detecting composition according to the present invention may contain a thickener.

The thickener is not particularly limited as long as it has an edible property. Examples include dextrin, carrageenan, agar, cellulose (such as hydroxypropyl methylcellulose), and sodium alginate.

When the thickener is added to the oxygen detecting composition, in particular, on a base material constituted by paper, good coloring property and discoloration property are obtained, and color development and discoloration occur quickly.

The thickener is incorporated in an amount of preferably 0.1 to 10 mass %, more preferably 0.5 to 3 mass % based on the total amount of the composition.

In the present invention, for example, in order to facilitate the application or print of the oxygen detecting composition, the oxygen detecting composition may be used in the form of being dissolved in a solvent, as needed.

The solvent to be used is not particularly limited as long as it has an edible property.

Examples of the solvent include water and ethanol.

Incidentally, when the water is added to the ethanol, the amount of the water to use is preferably in the range of 10 to 70 mass %, more preferably 35 to 55 mass % with respect to the ethanol.

Such an oxygen detecting composition can be printed, applied or the like, as character(s), figure(s), picture pattern(s) or the like, at the predetermined position on the surface of the base material by a well-known printing method or applying method, such as flexographic printing, gravure printing, offset printing, relief printing and screen printing, to obtain an oxygen detecting body, which detects and indicates the presence or absence of oxygen in the inside of the packaging body or the like.

The printing method selected is preferably flexographic printing because good printability is obtained.

For the base material, a general base material, such as paper, synthetic paper, nonwoven fabric and a synthetic resin film, can be used in accordance with the purpose and usage form.

In particular, when the oxygen detecting composition contains the thickener, an inkjet label base material (a base material used for forming a label with an inkjet print head) is preferably selected for the base material because good coloring property and discoloration property are obtained, and color development and discoloration occur quickly.

The shape of the base material selected is not particularly limited, and may be in a sheet shape or the like.

In the present invention, a pattern, a pattern, such as character(s) and picture pattern(s), which is composed of an ink composition, may be applied on the surface of the oxygen detecting body 1 by a well-known method, such as application or print.

The ink composition is preferably composed of the edible colorant and the edible humectant.

In this case, the edible colorant is appropriately used by being mixed so as to provide a desired color such as black.

Incidentally, the ink composition may also contain the thickener in order to, for example, facilitate the application or print thereof or to provide good color development.

In addition, the ink composition may be used in the form of being dissolved in the above-described solvent in order to, for example, facilitate the application or print thereof, as needed.

The application or print of the ink composition can be easily performed by the above-described well-known application or printing method.

After the oxygen detecting composition is applied or printed to the base material, the surface of the base material may be overcoated by a well-known overcoating method to protect the surface.

Such an oxygen detecting body may be used, for example, in the form of being adhered on the outer surface of a deoxidizer by a well-known means, and being sealed within packaging body formed of a gas-barrier material and containing contents such as foods and pharmaceuticals.

EXAMPLES

Hereinafter, the present invention will be described in detail with reference to Examples; However, the present invention is not limited by these Examples.

Example 1

According to the composition of the following Table 1, components was admixed and stirred to obtain a desired oxygen detecting compositions.

TABLE 1

Composition of oxygen detecting compositions (unit: mass %)

| Components | Ratio | | |
| --- | --- | --- | --- |
| | Example 1 | Example 2 | Example 3 |
| Methylene blue | 0.07 | 0.10 | 0.20 |
| Food Red No. 106 | 0.08 | 0.10 | 0.25 |
| Fructose | 7.00 | 5.00 | 10.00 |
| Sodium hydroxide | 1.50 | 2.00 | 3.00 |
| Glycerin | 5.00 | 7.00 | 10.00 |
| Ethanol | 40.42 | 52.00 | 38.90 |

TABLE 1-continued

Composition of oxygen detecting compositions (unit: mass %)

| Components | Ratio | | |
| --- | --- | --- | --- |
| | Example 1 | Example 2 | Example 3 |
| Hydroxypropyl methylcellulose | 0.60 | 1.00 | 1.00 |
| Water | 45.33 | 32.80 | 36.65 |
| Total | 100.00 | 100.00 | 100.00 |

Example 4

On inkjet label paper (manufactured by MARUU SEC-CHAKU Corporation, IJA-1), the oxygen detecting composition obtained in Example 1 above was printed at a ratio of 4 $g/m^2$ with a flexographic printing machine (manufactured by MPS Systems B.V., EC330) to form an oxygen detecting region.

In addition, on the base material, an ink composition was printed at a ratio of 2 $g/m^2$ with the flexographic printing machine (manufactured by MPS Systems B.V., EC330). Thereafter, the surface of the base material was overcoated with OPP 20μ adhesive tape, and the base material was cut into strips to obtain tape-shaped oxygen detecting bodies having the oxygen detecting region.

Incidentally, the ink composition was obtained by mixing and stirring the components according to the composition of the following Table 2.

TABLE 2

Composition of composition (unit: mass %)

| Components | Ratio |
| --- | --- |
| Food Red No. 106 | 0.10 |
| Food Red No. 102 | 2.40 |
| Food Yellow No. 4 | 1.00 |
| Food Blue No. 1 | 1.50 |
| Glycerol | 10.00 |
| Ethanol | 22.20 |
| Hydroxypropylmethylcellulose | 1.25 |
| Water | 61.55 |
| Total | 100.00 |

Examples 5 and 6

The oxygen detecting bodies was obtained in the manner as in Example 4 except that the oxygen detecting composition obtained in Example 2 or 3 was used instead of the oxygen detecting composition obtained in Example 1.

Test Example

Evaluation of Discoloration Property

The oxygen detecting bodies obtained above were subjected to a discoloration test in accordance with the following measurement method.
<Test Method>
The oxygen detecting body was placed into a gas-barrier transparent container. The container was purged with nitrogen, and subsequently sealed and stored at a temperature of 25° C. A color change of the oxygen detecting region was visually observed.

<Results>

The color of all of the oxygen detecting bodies thus obtained changed from blue-violet to red or pink in approximately 7 hours, which indicates the absence of oxygen.

When the container was opened, the oxygen detecting bodies were exposed to the air and quickly returned to blue-violet, which indicate the presence of oxygen.

As described above, apparently, the oxygen detecting bodies according to the present invention have excellent oxygen detectability even though they are composed of the edible components, which is safe to the human body.

INDUSTRIAL APPLICABILITY

The oxygen detecting composition and the oxygen detecting body according to the present invention enable detection of the presence or absence of oxygen by means of color change. Since the oxygen detecting composition is safe to the human body due to comprising edible components only, it can be sealed in the packaging body containing foods, medical supplies or the like at ease.

Thus, the present invention is probably applied to an industry of producing or handling packaging body containing foods, medical supplies or the like.

Explanation of Signs 1 oxygen detecting body
2 oxygen detecting composition
3 base material
4 ink composition
5 deoxidizer
6 packaging body

The invention claimed is:

1. An oxygen detecting composition comprising an oxidation-reduction colorant, an edible colorant, a reducing sugar, an edible reduction promoter, an edible humectant, and an edible thickener,
   wherein the oxidation-reduction colorant is comprised in an amount of 0.03 to 0.5 mass % based on the total amount of the composition,
   a compounding ratio of the oxidation-reduction colorant to the edible colorant is 1:0.5 to 1:1.5, and
   the edible thickener is comprised in an amount of 0.1 to 10 mass % based on the total amount of the composition.

2. The oxygen detecting composition according to claim 1, wherein the oxygen detecting composition comprises ethanol, water, or a mixture thereof.

3. An oxygen detecting body, wherein the oxygen detecting composition according to claim 1 is applied or printed to a base material.

4. The oxygen detecting composition according to claim 3, wherein the base material is constituted by an inkjet label base material.

5. The oxygen detecting body according to claim 3, wherein the base material is constituted by paper.

6. An oxygen detecting body, wherein the oxygen detecting composition according to claim 2 is applied or printed to a base material.

* * * * *